Sept. 9, 1958     P. SCHWERIN     2,850,903

SALIVATION TESTING METHODS AND DEVICES

Filed Jan. 14, 1957

Fabric Carrying A Pure Food Dye Dispersed In Powder

INVENTOR.
Paul Schwerin
BY Edwin Laircoh &
Harry Cohn
ATTORNEYS

United States Patent Office 2,850,903
Patented Sept. 9, 1958

2,850,903

SALIVATION TESTING METHODS AND DEVICES

Paul Schwerin, Dumont, N. J.

Application January 14, 1957, Serial No. 633,962

19 Claims. (Cl. 73—432)

The present invention relates to methods and means for determining the salivation response of individuals or groups of individuals to various stimuli.

It is well known that the flow of saliva from the salivary glands is stimulated or induced by the sight, smell and taste of various foods and other articles and materials as well as by pictorial or other representations thereof or by hearing oral descriptions of various articles or materials or dissertations thereon. Based upon this phenomenon it is possible to determine for commercial and other purposes the likes or dislikes of other various individuals and groups of people in respect to various products or advertisements thereof by newspapers and magazines or by radio, television, and motion pictures.

The purpose of the present invention is the provision of a simple, practicable method for determining salivation response to various stimuli, and the provision of a device which is well adapted for use in practicing said method. The accomplishment of this purpose, both as to method and device, constitutes a primary object of the present invention.

The above object, other objects which hereinafter might appear and the said methods and devices of this invention will be fully understood from the following description considered in connection with the accompanying illustrative drawings.

The preferred form of the test device and the preferred mode of performing the method of the present invention will now be described with reference to Figs. 1 to 3 of the drawings. As here shown, the salivation test device of the present invention comprises an oval shaped moisture-absorptive roll or winding 10 of sterile bandage gauze fabric. In itself, this fabric is a well known material and therefore needs no further description, it being sufficient to note that as indicated by the designation as "gauze," it is an open mesh fabric which is permeable to air and liquids. Pursuant to the present invention the gauze fabric, a portion 12 of which is indicated in Fig. 3, is impregnated or coated on both surfaces thereof with a test agent in the form of a fine powder, such as, for example but without limitation, corn starch, white wheat-flour or any other suitable powder which is non-toxic, odorless, tasteless and chemically inert to saliva. A small quantity of a pure food dye is thoroughly mixed with and dispersed throughout the powder. The quantity of dye can be very small, for example, just sufficient to slightly tint the powder in which it is dispersed. A suitable and preferred composition of this material consists of 0.1% of a water-soluble pure food dye, and 99.9% of corn starch in fine powder form. Any of the numerous water-soluble dyes which are classified as pure food dyes can be used and any dye color which contrasts with the color of the gauze fabric may be used. The powder-dye mixture may be applied to the fabric in any suitable way, for example by brushing the mixture onto the fabric at both sides thereof so that it remains on or in the fabric, in the interstices or in the form of a light superficial coating thereon. Any excess of the powder-dye mixture which does not remain on the fabric by self-adherence thereon as a result of the brushing operation will automatically drop off the fabric and is unnecessary as the amount which remains in place on the fabric is sufficient.

The winding 10 of the test device is formed from the above described dye-carrying fabric by winding the latter into a roll with the several fabric convolutions in close surface-to-surface contact. The roll is initially in the form of a cylinder, and while it may be utilized in such form, it is preferably flattened, more or less as illustrated, so that it is oval shaped. By preference, but without being narrowly limited thereto, the axial width of the roll is about 1", the major axis of the flattened or oval shaped roll has a length of about ⅝", and the minor axis of the oval roll has a length of ⅜". The device 10 is of a suitable size and shape to be placed in the subject's mouth and under the tongue near its root, as hereinafter stated.

Figure 1:
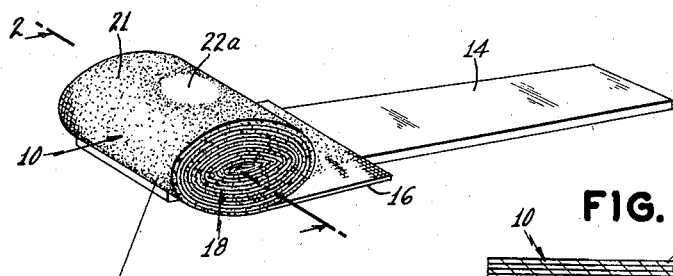
Fig. 1 is an enlarged perspective view of a salivation test device embodying the present invention, for use in performing the method of the present invention.
Figure 2:
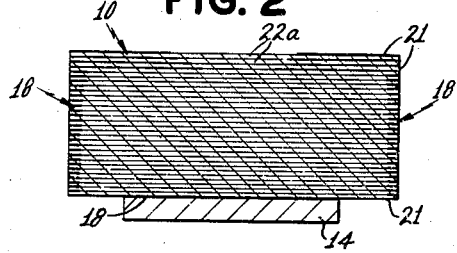
Fig. 2 is a fragmentary sectional view, on a larger scale, on the line 2—2 of Fig. 1.
Figure 3:
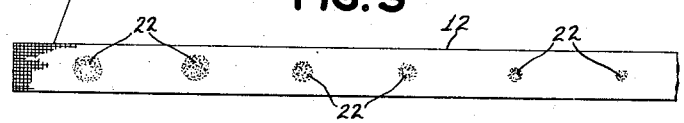
Fig. 3 is a view, on a reduced scale, of a piece of material from which the device shown in Fig. 1 is formed, and is illustrative of how said device indicates the salivation response pursuant to the method of the present invention.

In accordance with the presently preferred embodiment of the invention illustrated by Figs. 1 to 3, the winding is provided with a waterproof coating 21 which covers the entire external surfaces of the winding except at the restricted area 22a which is permeable to moisture. More specifically, the waterproof coating is preferably formed of non-hardening latex cement which may be applied to the winding in any suitable way, for example, by dipping the winding in the latex cement or by spraying the latex cement over the winding surfaces. In order to prevent the latex from reaching the moisture permeable area 22a, a removable shield is tightly clamped over said area, said shield being removed after the latex has dried.

A comparatively stiff handle 14 which is preferably formed of wood but which may be formed of any other suitable material is secured to the end portion 16 of the roll by the above mentioned latex cement. As illustrated in Fig. 2, the coating 21 penetrates through a few of the outermost convolutions and also through the opposite sides 18 of the winding for a short distance and thus releasably prevents the roll from unwinding. It will be understood that the small extent of penetration of the latex cement into the winding does not prevent the unwinding of the roll when that is desired for completing the tests as hereafter described.

In performing the method of the present invention for testing the salivation response of an individual, the test device is placed in the mouth, under the tongue and in front of its root which is the region of the mouth in which saliva collects. The test device is positioned with the handle 14 uppermost and the latter projects forwardly between the person's upper and lower teeth and the lips.

As soon as device 10 is placed in this position, the subject individual is subjected to a stimulus, for example, a television or radio commercial announcement concerning a particular food product. The saliva which flows as a result of the commercial announcement penetrates into the winding from the lower side thereof, through the water permeable area 22a of the external convolution, upwardly through the successive layers, with the result that the dye in the vehicle or carrier of corn starch or other fine powder is dissolved or activated by the saliva and colors the gauze fabric in the winding 10. The depth of penetration of the saliva into the winding is indicated by the dyeing or coloring of the fabric layers and this is readily ascertained by unwinding the roll 10 and observing and measuring the length of the fabric which is dyed or has dyed areas along its length or by counting the number of dyed areas along the length of fabric. For example, as illustrated by Fig. 3, the dyed portions of the fabric resulting from the saliva while the winding 10 is in the subject's mouth, as just described, may be manifested by a series of dyed areas indicated at 22 disposed along the length of the unwound roll. By counting the number of these areas or by measuring the length of fabric which is dyed or which has dyed areas therealong, an indication is obtained of the salivation response of the subject individual to the stimulus.

The moisture proof coating 21 has been found to be highly advantageous in that a well defined stain pattern formed by distinct dyed areas 22 is derived as a result of restricting the external surface area through which moisture can penetrate into the winding.

It will be understood that the length of time during which the test device is allowed to remain in the mouth is variable according to the technique of the conductor or supervisor of the tests and the characteristics of the product or other source of the salivation stimulus. Ordinarily less than a minute, say 20 to 30 seconds is sufficient for the test. On the other hand, it will be appreciated that the time of the test is a factor to be considered in combination with the depth of absorption to provide a measure of the rate of saliva flow in response to the stimulus.

Ordinarily, in conducting research tests the same salivation experiment or test would be performed on a group of individuals selected and assembled for that purpose, and test devices of identical characteristics would be used for all of the individuals of the group in the same investigation. If, as part of any particular research technique, it is desired to provide a basis for comparison between the salivation response to the product involved in the commercial under investigation and a product or other stimulus which is likely to bring about a different response, the test device of the present invention can of course be utilized; and in such case the devices used for both tests will be of the same character.

Figure 4:
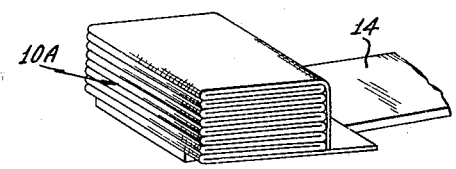
Figs. 4, 5 and 6 are perspective views similar to Fig. 1, showing other forms of test devices pursuant to the present invention.

Referring now to the form of the invention illustrated in Fig. 4, the test device 10A is of the same construction and is used in the same way as the device 10 described above with reference to Figs. 1 to 3, except that as shown by Fig. 4, the plurality of dye-carrying layers are formed by fan-folding the length of gauze instead of forming it into a roll. The three dimensions of the moisture absorptive device 10A of Fig. 4 are preferably of the order of the corresponding dimensions of the absorptive device 10 of Fig. 1, and is therefore of substantially the same size and shape as test device 10.

Figure 5:
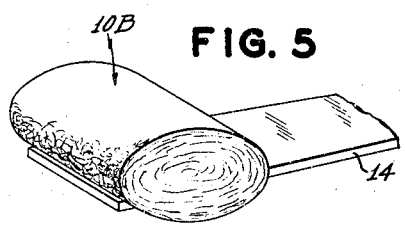
Figure 7:
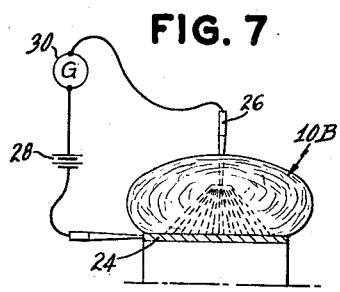
Fig. 7 is a view which illustrates more or less diagrammatically a modified form of practicing the method of the present invention, as compared with the presently preferred specific mode of practicing this invention.
Figure 6:
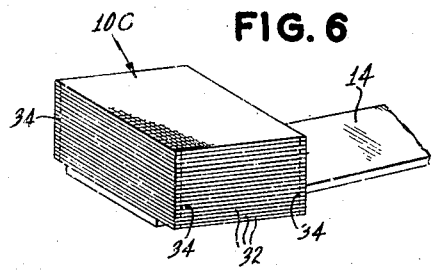

As illustrated in Fig. 5, the moisture absorptive device 10B is in the form of a compressed wad of cotton batting and has substantially the same shape and dimensions as the absorptive device 10 of Fig. 1. However, the device 10B is not impregnated or coated with a dyeing agent and the specific method of determining the depth of penetration of moisture into the device is different from that described above with reference to Figs. 1 to 4. More particularly, in order to determine the depth of penetration of the saliva into the device 10B, the specific method illustrated more or less diagrammatically by Fig. 7, is employed. As here shown, immediately or promptly after the device 10B is removed from the subject's mouth, following the salivation response, it is placed on a metal or other electrically conductive plate 24 with the lower side of the absorptive device in contact with said plate. A probe 26 in the form of a metal or other electrically-conductive needle 26 is then projected into the device 10B from the upper surface thereof, handle 14 having been removed. It will be noted that plate 24 and probe 26 are in circuit with an electric battery 28 and a galvanometer or other suitable electrically operated indicator 30, so that as soon as the free end or pointed tip of probe 26 comes in contact with moisture in said absorptive device a circuit is completed through galvanometer 30 and the latter is actuated. The depth of penetration of probe 26 into moisture absorptive device 10B necessary to complete the circuit is an indication of the depth of penetration of the moisture into the absorptive device and hence is an indication of the salivation response of the subject to the commercial announcement or other stimulus under investigation. Instead of utilizing a compressed wad of cotton batting in performing the test described with respect to Figs. 5 and 7, it is possible to utilize other forms of absorptive devices. For example the device shown by Figs. 1 and 4 could be used in which case it would not be necessary to coat or impregnate the gauze with the dye, or the absorptive device 10C illustrated by Fig. 6 could be employed. The latter device comprises a plurality of individual layers 32 of gauze of the type referred to above with reference to Figs. 1 and 4, said layers 32 being superposed on each other in contiguous surface-to-surface relation and secured in said relation in any suitable way, as by lines of stitching at the corners thereof, as indicated more or less diagrammatically at 34.

Figure 8:
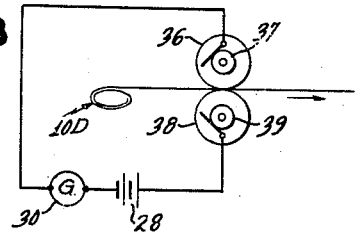
Fig. 8 is a diagrammatic view illustrating another mode of practicing the invention.

In accordance with the mode of practicing the invention illustrated by Fig. 8, the test device may be in the form of a winding 10D like the winding 10 illustrated by Fig. 1, for example, except that the powder-dye mixture need not be used. In other words, the winding 10D may consist merely of a roll of bandage gauze. In performing the method, according to this form of the invention, the roll or winding 10D, after being removed from the subject's mouth is progressively unwound and passed between electrically conductive elements, here shown as rollers 36 and 38. Rollers 36 and 38 are connected, by the slip rings 37 and 39, in series circuit relation with an electric battery and a galvanometer 30. The saliva-moistened spots or areas of the gauze, when drawn between the rollers 36 and 38, are of course effective to form a conductive path or bridging contact between said rollers to complete a circuit through the galvanometer or other indicator 30. As non-moistened or dry areas of the gauze are normally present along the length of the gauze between successive moistened areas resulting from the penetration of the saliva into the winding, such dry areas insulate the rollers from each other so that the meter 30 is intermittently actuated during the travel of the strip of gauze between the rollers and the number of deflections of the pointer of the meter can be readily counted to provide an indication of the depth of penetration of saliva into the test device. The external moisture-resistant coating 21 is omitted from the device in the forms illustrated by Figs. 5 to 7, although it may be provided if an uncoated area is left on the surface which makes electrical contact with the terminal plate 24.

As previously indicated, the preferred form of absorptive device of the present invention is that illustrated by Figs. 1 to 3, and the preferred method of determining salivation response involves the use of a device such as the device 10 or of a similar device wherein the depth of penetration of moisture into the absorptive device is determined according to the dyeing of the gauze by the dye contained in the powder with which the gauze is impregnated and/or coated as described above.

This application is a continuation in part of my application Serial No. 574,903, filed March 29, 1956.

While I have shown and described the preferred and other embodiments of my invention and modes of practicing the same, it will be understood that various changes may be made therein and will occur to skilled artisans in view of my disclosure. Accordingly, I do not wish to be limited to the specific details of construction and modes of operation hereinbefore referred to, except to the extent requested by the appended claims considered in the light of applicable prior art.

Having thus described my invention, what I claim and desire to secure by Letters Patent is:

1. A method of determining the salivation response of a person to a stimulus, comprising placing in a saliva-collection region of the person's mouth a moisture absorptive device which carries a water-soluble dye, subjecting the person to a salivation stimulus, and determining the extent to which said device is dyed by the action of the dye when the latter is activated by the person's saliva.

2. A method of determining the salivation response of a person to a stimulus, comprising placing in a saliva-collection region of the person's mouth a roll of moisture pervious sheet material carrying a water soluble dye, subjecting the person to a salivation stimulus, and determining the extent to which said roll is dyed by the reaction of the dye when the latter is activated by the person's saliva.

3. A method of determining the salivation response of a person to a stimulus, comprising placing a moisture absorptive device in the person's mouth in position to absorb saliva when the person is subjected to said stimulus, and determining the depth of penetration of the saliva into said device, by placing the device with a moist surface thereof against an electrical conductor and inserting another electrical conductor into said device at a point opposite to said surface, with said conductors in circuit with a source of current and an electrically operated indicator so that the latter is actuated when said other conductor comes in contact with the moisture absorbed by said device.

4. A salivation testing device, comprising a moisture absorptive member which comprises a plurality of layers of moisture-pervious material disposed in contiguous surface-to-surface relation, each of said layers carrying a water-soluble dye whereby the dye carried by said layers is dissolved by the saliva and dyes the dye-carrying layers, respectively, to the extent of penetration of the saliva into said member when the latter is placed in the saliva-collecting region of the mouth.

5. A salivation testing device, comprising a moisture absorptive member which comprises a plurality of layers of moisture-pervious material disposed in contiguous surface-to-surface relation, each of said layers carrying a non-toxic, tasteless and odorless powder chemically inert to saliva and having a water-soluble dye disposed therein whereby the dye is dissolved by the saliva and dyes the dye-carrying layers, respectively, to the extent of penetration of the saliva into said member when the latter is placed in a saliva-collecting region of the mouth.

6. A salivation testing device, comprising a moisture absorptive member which comprises a roll of moisture-pervious material having a plurality of layers disposed in contiguous surface-to-surface relation, each of said layers carrying a non-toxic, tasteless and odorless powder chemically inert to saliva and having a water-soluble dye dispersed therein whereby the dye is dissolved by the saliva and dyes the dye-carrying layers, respectively, to the extent of penetration of the saliva into said member when the latter is placed in a saliva-collecting region of the mouth.

7. A salivation testing device, comprising a moisture absorptive member which comprises a flattened roll member of bandage gauze comprising a plurality of layers disposed in contiguous surface-to-surface relation, each of said layers carrying corn starch powder having a water-soluble dye dispersed therein whereby the dye is dissolved by the saliva and dyes the dye-carrying layers, respectively, to the extent of penetration of the saliva into said member when the latter is placed in a saliva-collecting region of the mouth of a person when the latter is subjected to a stimulus which induces a flow of saliva.

8. A salivation testing device, comprising a moisture absorptive member which comprises a length of fabric folded transversely of its length to form a plurality of layers disposed in contiguous surface-to-surface relation, each of said layers carrying a water-soluble dye whereby the dye carried by said layers is dissolved by the saliva and dyes the dye-carrying layers, respectively, to the extent of penetration of the saliva into said member when the latter is placed in a saliva-collecting region of the mouth.

9. A salivation testing device, comprising a moisture absorptive member which comprises a plurality of layers of moisture-pervious material disposed in contiguous surface-to-surface relation, said member being insertable in the mouth of a person to a position in the region under the tongue and at the lingual side of the teeth whereby the person's saliva which collects in said region penetrates upwardly into said member, said member having a water-soluble dye incorporated therein whereby the member is dyed by the solution of said dye in the saliva to the extent of penetration of the saliva upwardly into said member, and a handle secured to said member in position to project forwardly between the upper and lower teeth when said member is in said position.

10. A method of determining the salivation response of a person, comprising placing in the person's mouth, in position to absorb saliva, a winding of moisture-absorptive material, removing the saliva-moistened winding from the subject's mouth, and progressively unwinding the winding and moving the unwound strip in the direction of its length between electrically conductive elements in bridging contact therewith in circuit with an electric meter and a source of electric current for energizing said meter when said electrically conductive elements are bridged by the moistened portions of said strip.

11. A method of determining salivation response, comprising placing in the saliva-collection region of the mouth, a length of moisture absorptive material in the form of a roll, removing the material from the mouth after a predetermined period of time, and measuring the length of said material which is moistened by the saliva during said period of time.

12. A salivation testing device comprising a moisture-absorptive member insertable in the mouth of a person to a position in the region under the tongue and at the lingual side of the teeth whereby the person's saliva which collects in said region penetrates upwardly into said member, said member having an external surface portion permeable to moisture for said penetration of the saliva into said member and having a moisture resistant external surface portion for restricting the area through which moisture may penetrate into said member.

13. A salivation testing device, comprising a moisture-absorptive member which comprises a plurality of layers of moisture-pervious material disposed in contiguous surface-to-surface relation, said member being insertable in the mouth of a person to a position in the region under the tongue and at the lingual side of the teeth whereby the person's saliva which collects in said region penetrates upwardly into said member, said member having a water-soluble dye incorporated therein whereby the member is dyed by the solution of said dye in the saliva to the extent of penetration of the saliva upwardly into said member, said member having an external surface portion permeable to moisture for said penetration of the saliva into said member and having a moisture-resistant external surface adjacent said moisture-permeable portion for restricting the area through which moisture may penetrate into said member.

14. A salivation testing device, comprising a moisture absorptive member which comprises a plurality of layers of moisture-pervious material disposed in contiguous surface-to-surface relation, each of said layers carrying a water-soluble dye whereby the dye carried by said layers is dissolved by the saliva and dyes the dye-carrying layers, respectively, to the extent of penetration of the saliva into said member when the latter is placed in the saliva-collecting region of the mouth of a person when the latter is subjected to a stimulus which induces a flow of saliva, said member having an external surface portion permeable to moisture for said penetration of the saliva into said member and having a moisture-resistant external surface adjacent said moisture-permeable portion for restricting the area through which moisture may penetrate into said member.

15. A salivation testing device, comprising a moisture absorptive member which comprises a flattened roll member of bandage gauze comprising a plurality of layers disposed in contiguous surface-to-surface relation, each of said layers carrying corn starch powder having a water-soluble dye dispersed therein whereby the dye is dissolved by the saliva and dyes the dye-carrying layers, respectively, to the extent of penetration of the saliva into said member when the latter is placed in a saliva-collecting region of the mouth of a person when the latter is subjected to a stimulus which induces a flow of saliva, said member having an external surface portion permeable to moisture for said penetration of the saliva into said member and having a moisture-resistant external surface adjacent said moisture-permeable portion for restricting the area through which moisture may penetrate into said member.

16. A method of determining the salivation response of a person to a stimulus, comprising placing in a saliva-collection region of the person's mouth a moisture absorptive device which comprises a winding of moisture-permeable material carrying a water-soluble dye, removing said device from the mouth after a predetermined period of time, unwinding said winding, and counting the number of dyed areas of said material along a length of said material for determining the extent of penetration of the saliva into the winding during said predetermined period of time.

17. A method of determining the salivation response of a person to a stimulus, comprising placing in a saliva-collection region of the person's mouth a moisture-absorptive device which comprises a winding of moisture-permeable material carrying a water-soluble dye, said winding having an external surface portion permeable to moisture for said penetration of the saliva into said member and having a moisture-resistant external surface adjacent said moisture-permeable portion for restricting the area through which moisture may penetrate into said member, removing said device from the mouth after a predetermined period of time, unwinding said winding, and counting the number of dyed areas of said material along a length of said material for determining the extent of penetration of the saliva into the winding during said predetermined period of time.

18. A saliva testing method, comprising placing in the saliva-collection region of the mouth a moisture-absorptive device carrying a water-soluble dye, removing the device from the mouth after a predetermined period of time, and determining the extent to which said device is dyed as a result of said placement of the device in the mouth.

19. A saliva testing method, comprising placing lamina or coil moisture-absorptive sheet material in the saliva-collection region of the mouth, removing the material from the mouth after a predetermined period of time, and dimensionally measuring the quantity of sheet material which is moistened by the saliva during said period of time.

No references cited.